US007370321B2

(12) United States Patent
Radigan

(10) Patent No.: US 7,370,321 B2
(45) Date of Patent: May 6, 2008

(54) SYSTEMS AND METHODS TO READ, OPTIMIZE, AND VERIFY BYTE CODES FOR A MULTIPLATFORM JIT

(75) Inventor: Jim Radigan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 468 days.

(21) Appl. No.: 10/294,362

(22) Filed: Nov. 14, 2002

(65) Prior Publication Data

US 2004/0098710 A1 May 20, 2004

(51) Int. Cl.
*G06F 9/45* (2006.01)
(52) U.S. Cl. ...................................... 717/144
(58) Field of Classification Search ........ 717/144–148, 717/140–143, 158, 159, 136, 161, 153–157, 717/151–152, 156; 714/35, 38, 26
See application file for complete search history.

(56) References Cited

U.S. PATENT DOCUMENTS

| 5,659,754 | A | * | 8/1997 | Grove et al. ................. 717/158 |
| 5,778,233 | A | * | 7/1998 | Besaw et al. ............... 717/154 |
| 6,249,910 | B1 | * | 6/2001 | Ju et al. ...................... 717/146 |
| 6,457,172 | B1 | * | 9/2002 | Carmichael et al. ........ 717/141 |
| 6,651,247 | B1 | * | 11/2003 | Srinivasan .................. 717/161 |
| 7,058,935 | B2 | * | 6/2006 | Kawahito et al. ........... 717/151 |
| 2002/0144245 | A1 | * | 10/2002 | Lueh ........................... 717/140 |
| 2003/0149969 | A1 | * | 8/2003 | Ogasawara ................. 717/158 |
| 2004/0003380 | A1 | * | 1/2004 | Fedorov ..................... 717/148 |
| 2004/0025083 | A1 | * | 2/2004 | Nanja et al. ................. 714/35 |
| 2004/0049769 | A1 | * | 3/2004 | Lueh et al. ................. 717/158 |

OTHER PUBLICATIONS

Lapkowski et al. "Extended SSA Numbering: Introducing SSA properties to languages with multi-level pointers", IBM Press, Nov. 1966.*
John Whaley "Joeq: a virtual machine and compiler infrastructure" Jun. 2003 ACM Press, IVME' 03, pp. 58-66.*
Michael P. Gerlek, et al. "Beyond Induction Variables: Detecting and Classifying Sequences Using a Demand-Driven SSA", Jan. 1995, ACM Press, TOPLAS vol. 17, Issue 1 pp. 85-122.*
Cytron, R. et al., "An Efficient Method of Computing Static Single Assignment Form", *Principles of Programming Language*, 1989, 25-35.

(Continued)

*Primary Examiner*—Wei Zhen
*Assistant Examiner*—Anna Deng
(74) *Attorney, Agent, or Firm*—Woodcock Washburn LLP

(57) ABSTRACT

A byte code reader provides verification while optimizing and creating an internal SSA form to allow efficient machine code generation. Many functions are combined in one component honoring the difficult time constraints of just-in-time translation. This reader is engineered for retargeting and thus expedites the implementation of a JIT for any platform. The reader takes two single passes over the byte codes: a first pass that builds a flow graph using any set of rules for node creation, and maps definitions from the byte codes onto the flow graph nodes, and a second pass that translates whatever is in the byte codes into optimized machine code (or a traditional compiler intermediate form) with an embedded SSA graph. Global verification and global optimization are implemented while reading. Two data structures and a main program loop are provided. The data structures are used to allow the creation of a flow graph, and an exception handling (EH) graph.

26 Claims, 9 Drawing Sheets

OTHER PUBLICATIONS

Goff, T. et al., "Preemptive Routing in Ad Hoc Networks", *ACM Sigmobile*, 2001, 43-52.

Pinter, S.S. et al., "Program Optimization and Parallelization Using Idioms", *ACM Transactions on Programming Languages and Systems*, 1994, 16(3), 305-327.

Stoutchinin, A. et al., "Efficient Static Single Assignment Form for Prediction", *IEEE*, 2001, 172-181.

Whaley, J. "Partial Method Compilation using Dynamic Profile Information", *OOPSLA*, 2001, 166-179.

* cited by examiner

800

SYSTEMS AND METHODS TO READ, OPTIMIZE, AND VERIFY BYTE CODES FOR A MULTIPLATFORM JIT

FIELD OF THE INVENTION

This invention relates in general to the field of compilers. More particularly, this invention relates to reading intermediate language code produced by a compiler and the optimization and verification of such intermediate language code within the difficult time constraints of just-in-time translation.

BACKGROUND OF THE INVENTION

Intermediate language (IL) code, such as MSIL (Microsoft Intermediate Language, produced by Microsoft Corporation, Redmond, Washington) or Java byte codes, is produced by a compiler at development time and then converted (e.g., JIT'ed or just-in-time translated) to machine code on a client machine. Conventionally, for each processor or platform supported, a different JIT compiler (referred to herein as a JIT) must be developed. Additionally, one of the typical steps performed by the client machine at run time is to verify the IL (or byte code stream) as part of the JIT process.

A JIT performs just-in-time translation of abstract byte codes to machine code under very tight time constraints that a normal compiler would not deal with. Conventionally, the prior art shows that a JIT will perform several passes (in different components) to produce optimized machine code that has been verified as safe for the target architecture. This invention improves on the prior art by performing both verification and optimizations in the JIT's reader, simultaneously, so that the resulting internal representation also contains an embedded form of analysis typically used for many traditional compiler optimizations. Additionally, this machine independent component can be easily re-targeted for many different processors. Thus, the invention provides a method to combine many functions in one pass which is a significant improvement to the prior art in an area (just-in-time translation) where time is critical.

SUMMARY OF THE INVENTION

The present invention is directed to a software system component that initially reads an intermediate language (IL), in the form of a byte code stream, for just-in-time translations (JITs). This IL is normally referred to as byte codes within the context of a Java implementation or MSIL for Microsoft's .Net platform. This reader provides verification, optimization, the creation of static single assignment (SSA), and expedites the implementation of a JIT for many different platforms. Specifically, the reader can verify the input (e.g., MSIL byte codes), create a flow graph that models asynchronous exception handling, allow a client to plug-in custom IL generation routines, optimize "on the fly" while verifying and constructing an SSA graph.

Thus, the invention allows any JIT (using this reader component) to come out of the reader phase, fully verified, in a partially optimized intermediate compiler representation that contains an embedded form of analysis for final machine code generation.

According to an embodiment of the invention, the reader takes two passes over the IL: a first pass builds a connected flow graph where paths in the graph represent possible paths of execution and the nodes indicate sections of the graph that are single entrance single exit. This pass also maps definition points from the IL into flow graph nodes. Given the definition points and the flow graph, the reader can then calculate all the points that SSA would require a phi function. The second pass translates whatever is in the IL into machine code for each appropriate flow graph node (while embedding SSA UD edges in the resulting machine code data structures). According to features of the invention, global verification and global optimization can be performed during the reader's steps to instantiate a compiler's internal representation for code generation. Aspects of the present invention include a flow graph, an exception handling (EH) graph, and a reader loop.

Features of the invention also include a portion of the reader that can digest an extended SSA (ESSA) encoding produced by a development compiler. The development compiler that creates the initial byte codes that this reader inputs, only has to decorate the byte codes with an ESSA graph that captures the complex alias relationships involving definitions and uses. The extended SSA encoding allows a JIT (with the reader) to perform target-specific, complex, global optimizations traditionally performed only in a native compiler. Specifically, this is made possible within the stringent time constraints of a JIT by forcing the analysis time into the development compiler which then transmits all the analysis information to the JIT in the form of another SSA graph, namely ESSA. This reader (optionally) uses this ESSA information to enhance its final SSA graph.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to an intermediate language (IL) reader that generates a flow graph and maps definitions from the IL into the flow graph nodes. A loop parses the IL instruction stream (byte code stream) and populates the flow graph nodes with pointers into the byte code stream. Verification and optimization are also provided.

A client is given a base class for a flow graph node and a base class for a node in an exception handling (EH) try-region graph. Additionally, there is a reader class which contains the code to loop over the IL byte codes. The reader class allows a compiler to splice its specific IL into an appropriate flow graph node that may point to a node in the EH graph.

Exemplary Computing Environment

Figure 1:
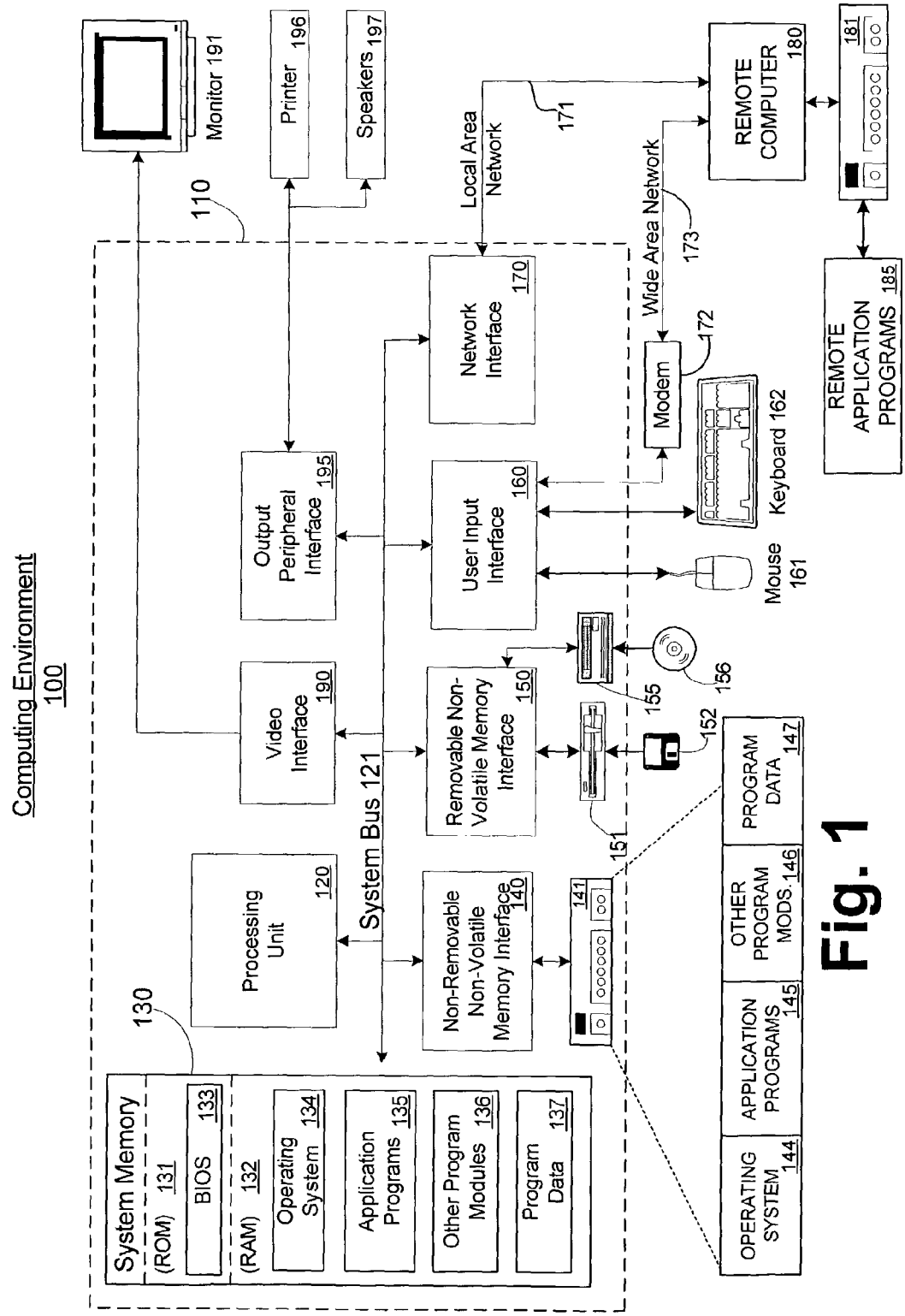
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, nonvolatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and a printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks Or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers and building-block services, such as web-based data storage and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, application programming interface (API) or a "middle man" object between a coprocessor and requesting object, such that services may be performed by, supported in, or accessed via all of .NET's languages and services, and in other distributed computing frameworks as well.

Exemplary Embodiments

A reader is provided that passes over the IL (byte codes) to build a flow graph and to map definitions from that IL (byte codes possibly received over a network) into the containing flow graph nodes. The IL is thereafter translated into machine code, records, data elements, or tuples, for example. A static single assignment (SSA) is incorporated to provide global verification and global optimization.

Figure 2:
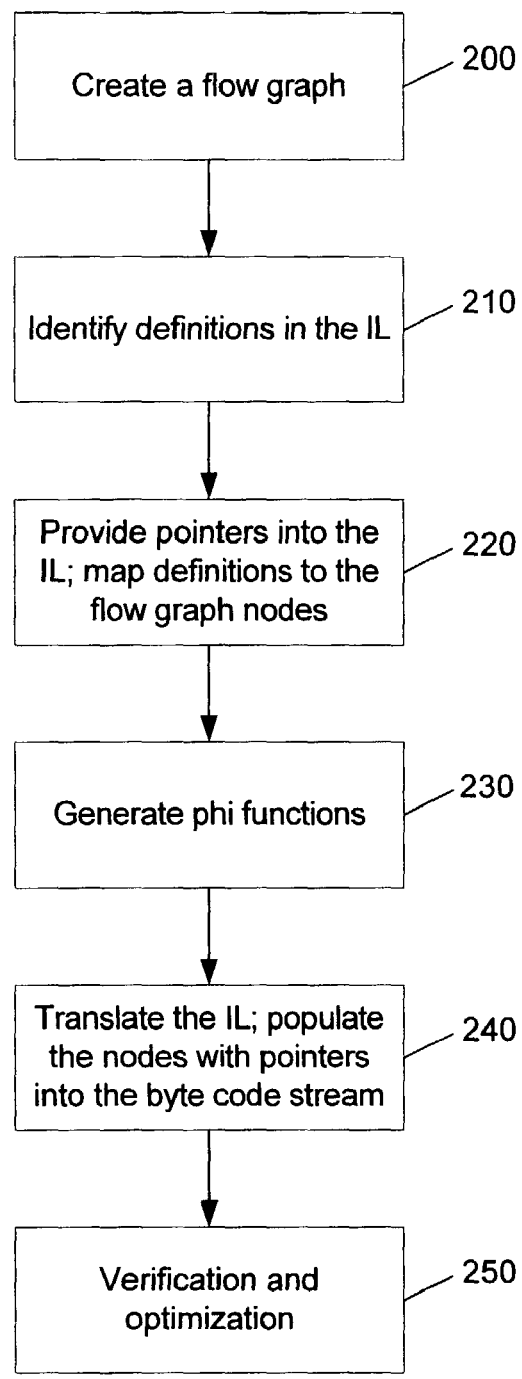
FIG. 2 is a flow diagram of an exemplary process in accordance with the present invention.

FIG. 2 is a flow diagram of an exemplary process in accordance with the present invention. Initially, IL is provided and, during a first pass, at step 200, a flow graph is generated that is empty. At step 210, definitions in the IL are identified. Pointers are provided that point into the IL and the definitions in the IL are then mapped to the correct flow graph nodes, at step 220. After the definition points have been generated, phi functions (described in further detail below) are generated at step 230 for those definitions. During a second pass, at step 240, the flow graph is used to translate the IL into machine code, records, data elements, or tuples. During the translation, the nodes of the flow graph are populated with a compiler intermediate form used for final code generation.

As the internal representations are built, an SSA is generated. Using the SSA and the phi functions, global verification and optimization are performed while reading in the IL, during the second pass, at step 250. In this manner, a single pass is used to perform global verification and optimization, and dead code (i.e., unreachable code) is not created as it is avoided in the second pass. Specifically, unreachable code is never materialized in the JIT because during the second pass, it is determined that such code is contained in a flow graph node that has no predecessors, and therefore can be ignored during the second pass. Moreover, preferably, zero initializers are implemented during optimization. Zero initializers refers to a lookahead technique for the second operand of a phi function, to determine whether it is defined, and then initializing it to zero, if not. The single pass technique is fast, less prone to error and provably generates a program devoid of un-initialized local variables.

Figure 3:
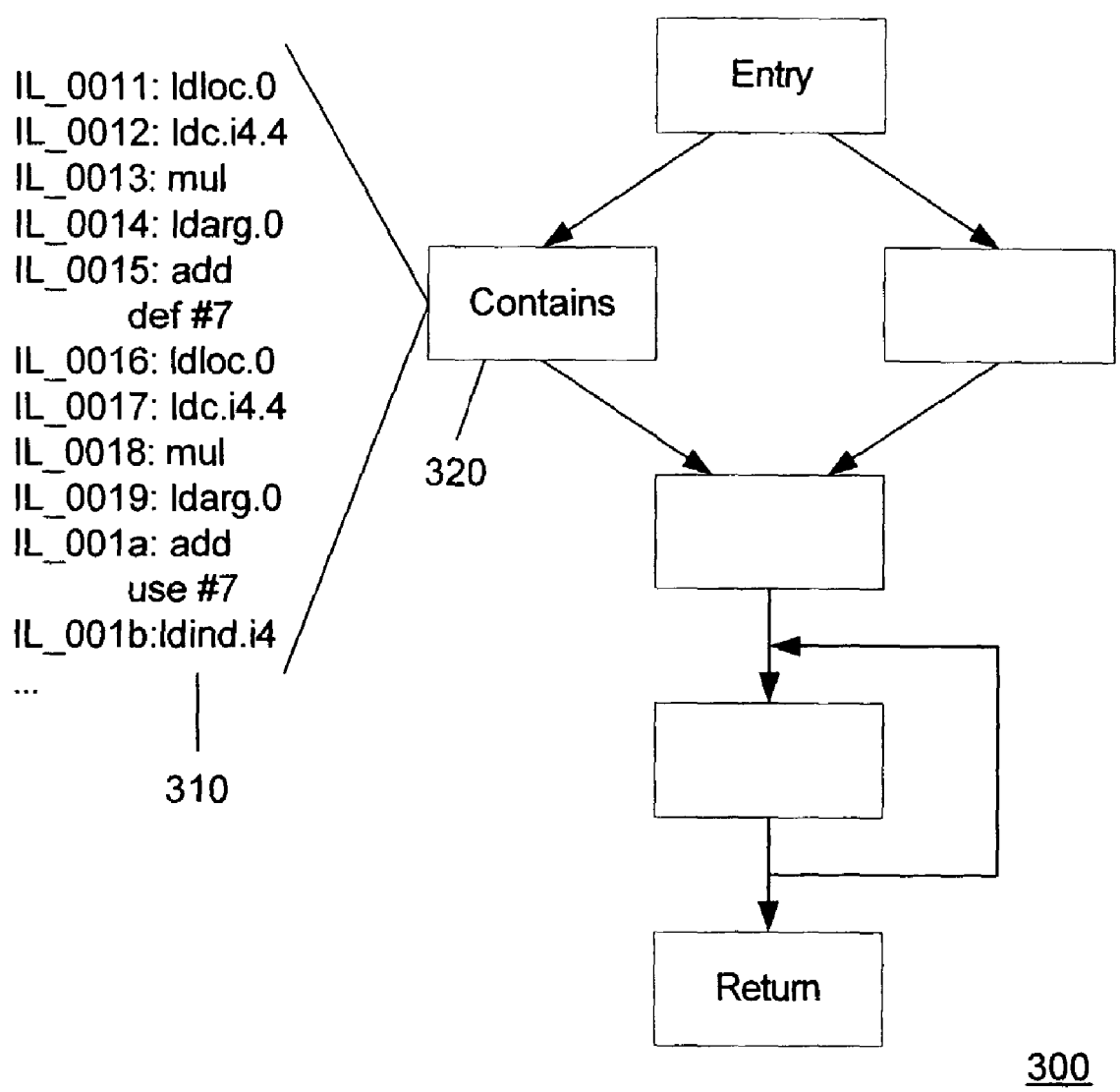
FIG. 3 is a diagram of an exemplary flow graph in accordance with the present invention.

Using a flow graph with pointers back to the IL (step 210), IL definition points are mapped to the appropriate flow graph nodes. Definition points include parameters upon entry, stores to locals, and scalars on the stack at the end of a block (also referred to herein as a node). It is desirable to map global definition points at certain offsets in IL (a linear description) to points in a two-dimensional flow graph. FIG. 3 shows a flow graph 300, with a definition ("def #7") in IL 310 that is mapped to the node 320. Note that this can be supplemented with information from a development compiler that adds an ESSA encoding to a file.

Thus, in a two pass reader, definition points are gathered (step 210) in the first pass of the reader while building the flow graph. These definitions preferably come from: (1) analysis of unaliased scalars (parameters, locals, and stacks), and (2) an ESSA that is augmenting the file from which the byte codes are read.

Figure 4:
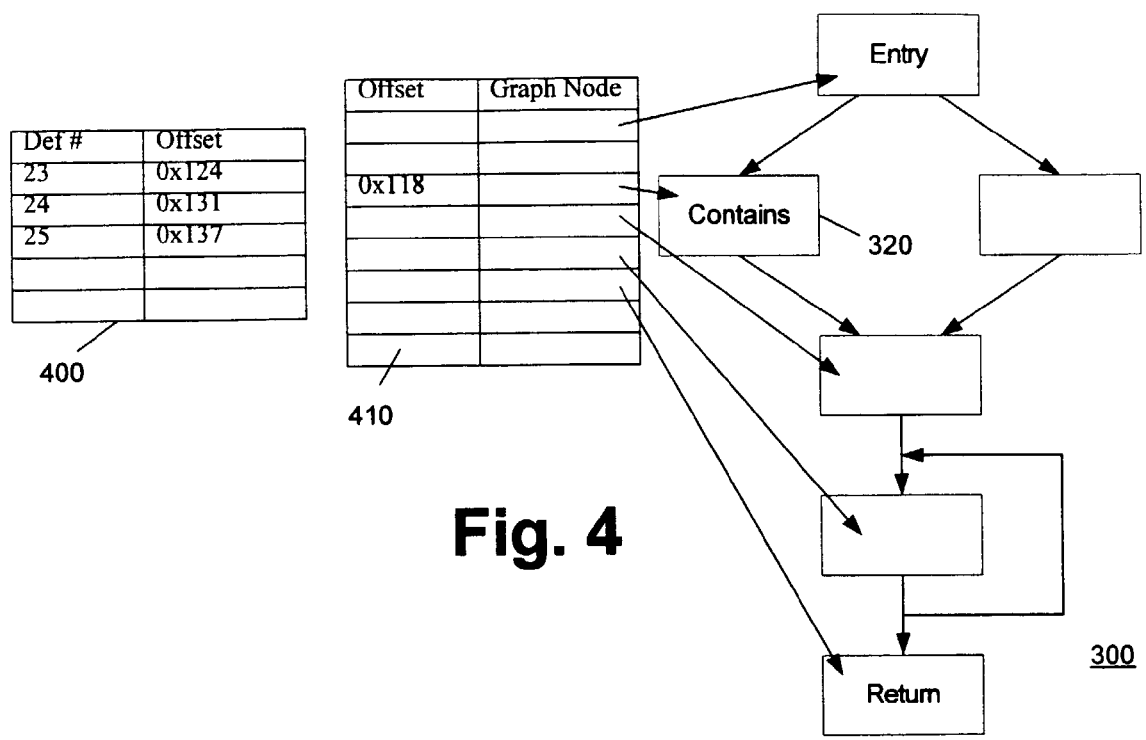
FIG. 4 is a diagram showing exemplary definitions, flow graph nodes, and a flow graph in accordance with the present invention.

The definition points are gathered in terms of IL file offsets, as shown in FIG. 4. Table 400 shows the relationship between definitions and offsets, and table 410 shows the offsets and their corresponding flow graph nodes. Here, for example, offset Ox 118 corresponds to node 320. In order to create an SSA, the definition points are mapped to nodes in a flow graph that already contain the appropriate phi nodes.

To populate the nodes of the flow graph with a compiler's intermediate form used for machine code generation, the byte code stream is traversed a second time(step 240). This traversal is guided by using the flow graph (with pointers back into the byte codes). The flow graph is traversed in a predetermined order (e.g., down one side of the flow graph, such as flow graph 300, and then up the other side). The machine code, records, data elements, or tuples are filled in for each basic block which corresponds to a flow graph node. Preferably, optimization is performed, and an SSA graph is created on the fly during this process.

SSA is used to provide global verification in a single pass without iteration. During an optional step, when the machine code, records, data elements, or tuples are being filled in for each basic block, optimization can be performed to generate an SSA form. In the second pass, as the code is being compiled, optimization/verification can be performed while creating the SSA graph. The definition numbers correspond to a stack that would be used during the renaming phase of SSA.

A "JIT-temp" is defined herein as an element that is pushed on the stack and is not consumed by the end of one of the basic blocks in the flow graph. It is desirable to identify all the JIT-temps and build phi functions for these before the reader's second pass where code generation is performed. It is desirable that the stack height at any join point be the same along all edges.

In the first pass, the blocks or nodes are built and the net contribution to the stack height is determined upon exit from each block. Phi functions are then built based on the abstract type-less tuple <block, live-out-top-of-stack-index>. If a block has a net contribution to the stack height along a path in the flow graph, then these will correspond to the N top of stack elements upon exit from the block.

During the first pass, the "net" contribution a basic block can make to a path in the flow graph is determined. Thus, the function that creates the phi nodes reasons about JIT-temp definition points as type-less abstract names <block_number, stack-index>.

Figure 5:
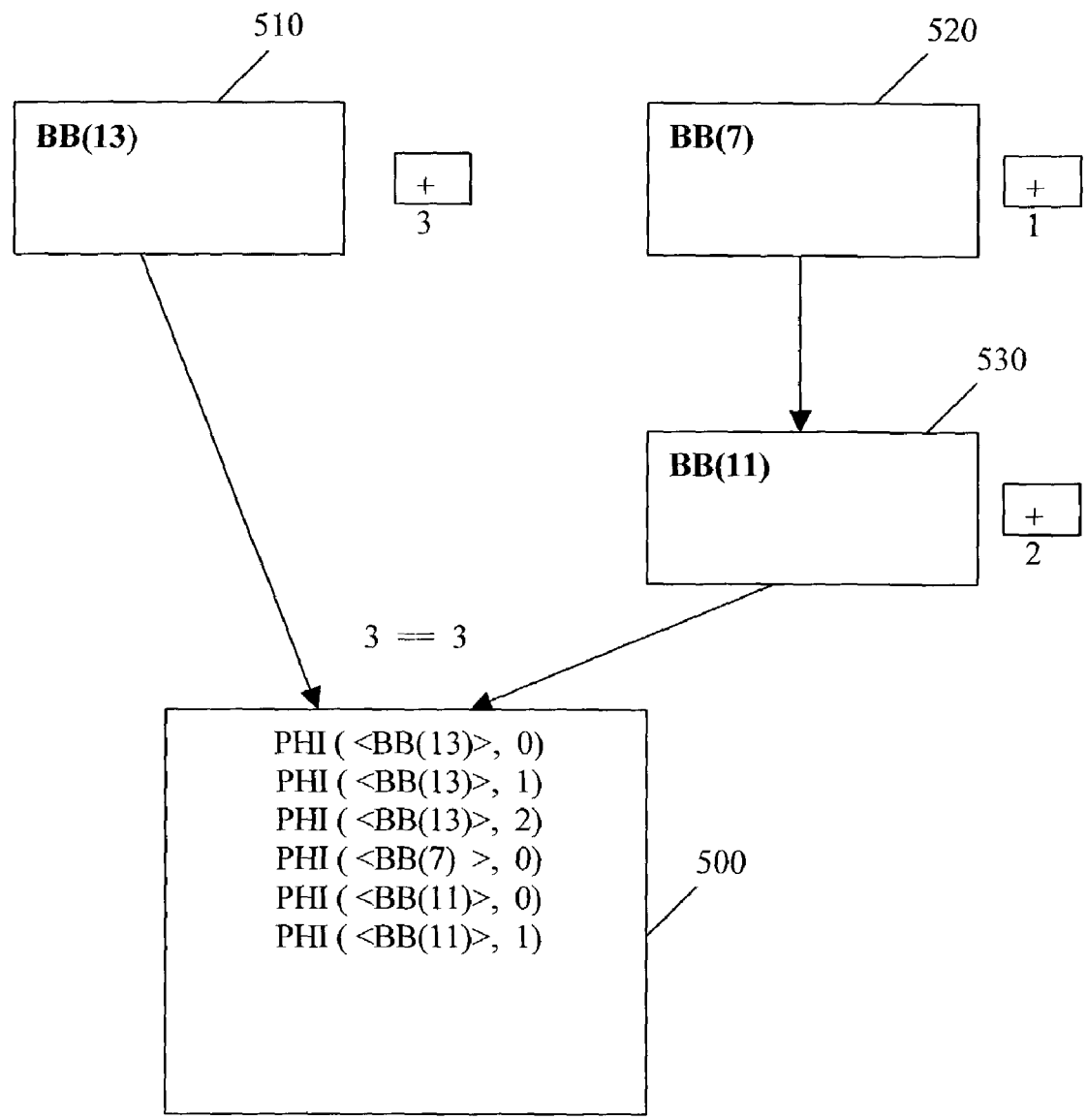
FIG. 5 is a diagram of another exemplary flow graph in accordance with the present invention.

As an example, with respect to FIG. 5, consider a particular flow graph node 510, referred to as basic block BB(13), that pushed three more scalars than it consumed. If evaluating the IL that was contained by the basic block 13 resulted in the net addition of three more temps on top of the stack, upon exit from the block 13, then the JIT would track three abstract definition points with names <BB(13), 0>; <BB(13), 1>; and <BB(13), 2>, as shown in element 500.

If the dominance frontier for BB(13) was calculated, then a phi node could be created for each of these abstract definition names. Thus, a flow graph (before tuple creation and after phi node insertion) would look like that provided in FIG. 5.

In this example, the join point must have at least three elements live on the stack along either path. A problem is that the first pass does not allow the definition point(s) and their associated type within the blocks to be precisely determined. The number of items live into each block is desired in order to identify the actual definition points that are within a block and that are live on exit. Abstract type-less names for definitions are created in the first pass, namely the tuples <BB(13), 2>. These names represent the basic block and the outgoing top-of-stack index. Given a block and a name, phi functions can be created. Binding types and verification are not implemented until the second pass.

The second pass of the reader performs a pre-order traversal of the flow graph filling in the JIT's code, records, data elements, or tuples. Because the phi functions have been inserted before the second pass, an SSA renaming can be performed during tuple creation. Global verification can also be performed using this same mechanism.

Thus, for verification of the JIT-temps, the renaming phase merges the correct phi functions so that during the pre-order traversal of the graph, this SSA renaming phase can make the proper correspondence of specific definition points in blocks to the operands in finalized phi functions with the correct number of operands. Furthermore, the renaming phase preferably creates a work list of IL operations to verify. The work list comprises operations that use the finalized phi function definitions.

Thus, in the example, the phi functions PHI (<BB(13)>, 2) and PHI (<BB(7)>, 1) should be merged to properly represent the confluence of a single JIT-temp defined in basic block 13 (element 510) and in basic block 11 (element 530). This is seen as merging the top-of-stack upon leaving BB(7) (element 520) with the stack element that is two deep from top-of-stack upon exiting BB(13).

Eventually, these two phi functions should look like this finalized phi function: actual_stack_height=phi(type1, type2). This phi function describes the type(s) a certain stack element can have at a particular point of confluence. A problem during the preorder traversal (i.e., the second pass of the reader) is that the pre-order traversal only allows the type of a JIT-temp to be determined along one edge of a confluence point at a time. Thus, the phi nodes can be translated into finalized phi nodes one "path" at a time.

The SSA renaming technique looks ahead at each join point and renames one operand of phi. That operand corresponds to the edge into the join point currently being traversed. In the JIT-temp scenario, the merging of the phi functions contained in a join point is provided.

If during the first pass, blocks 13 and 11 are marked as having definitions that are live on exit, then during the renaming pass the actual TYPE can be binded with the abstract name (<BB(13)>, tos-index) used to create the phi functions.

During the renaming phase when join points are looked ahead into, the SSA renaming stacks are used with the TYPES that are binded to the renaming stack elements to actually modify the correct phi functions.

Figure 6:
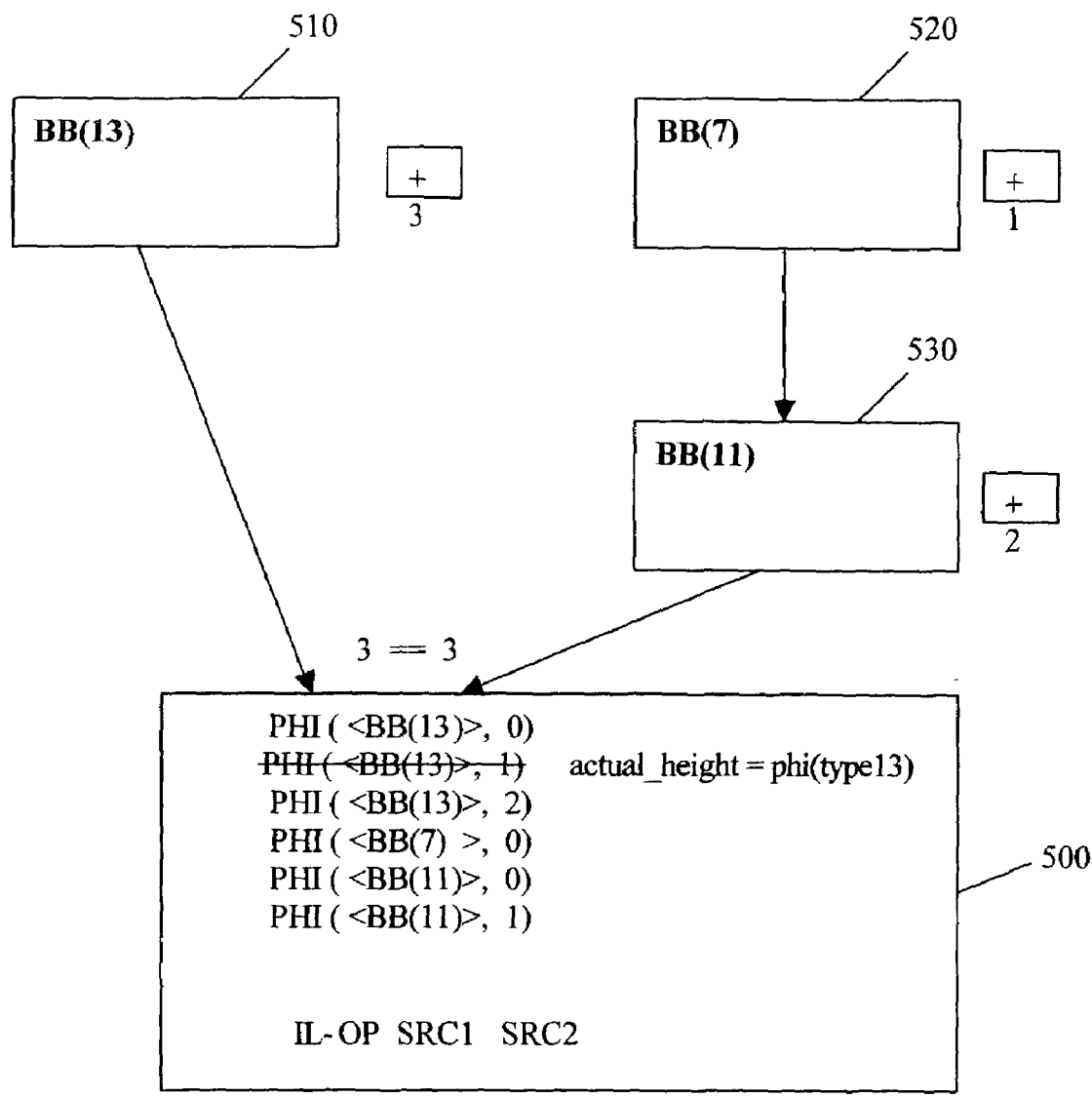
FIG. 6 is a diagram of the exemplary flow graph of FIG. 5 with a changed phi function in accordance with the present invention.

For example, if the flow graph is traversed along the path that contained block 13 into the join point, the phi node would be changed as shown in node 500 in FIG. 6. The actual stack height will allow the other phi function to be identified that is needed to be merged with this new phi function. The stack height is desirably identical for all paths into the join point regardless of verification.

Figure 7:
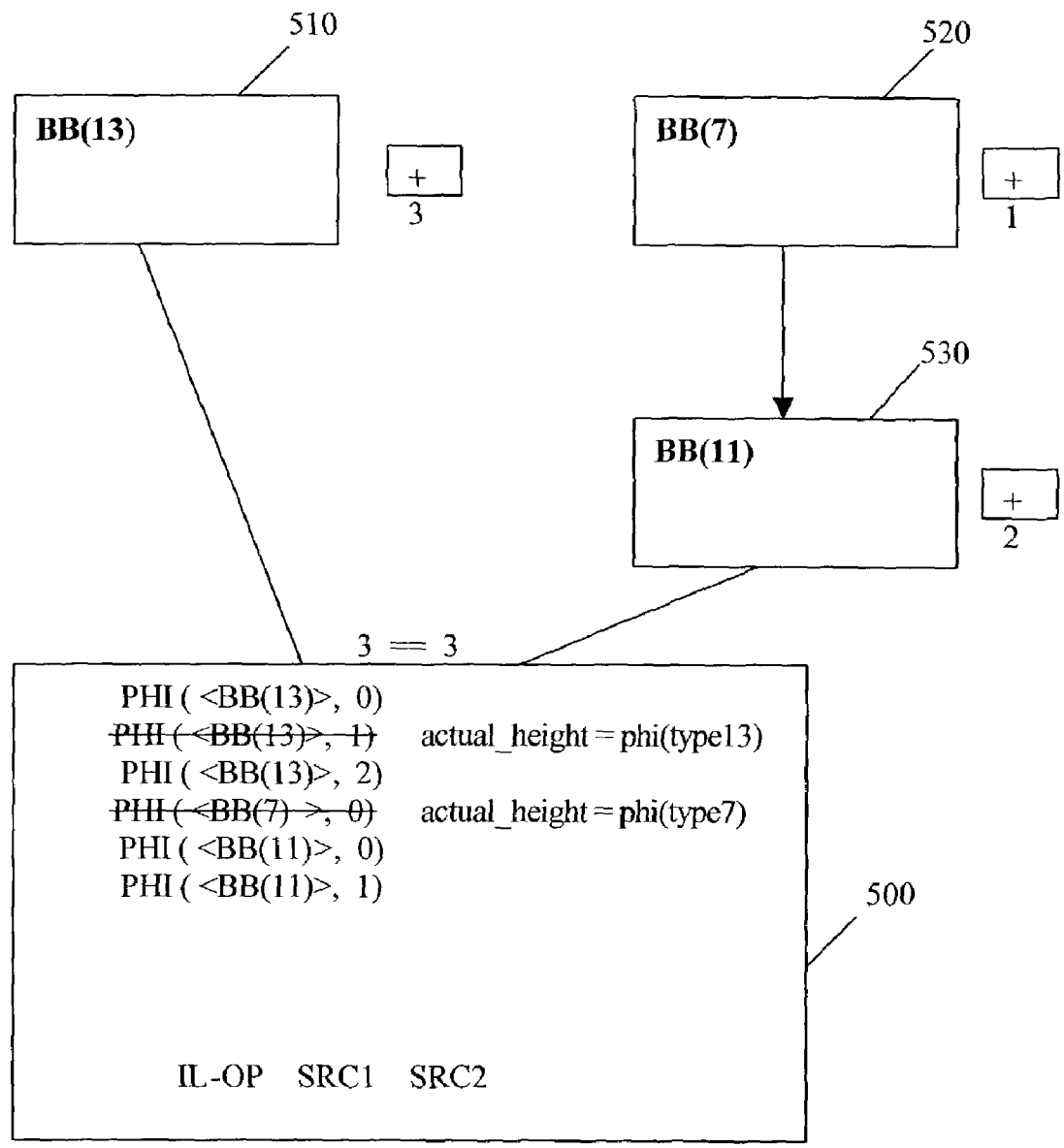
FIG. 7 is a diagram of the exemplary flow graph of FIG. 5 with further changed phi functions in accordance with the present invention.

Thus, when the renaming phase comes down the path into the join involving BB(7) (node 520), a change is made by using the actual stack height and the basic block number of the definition site. What remains is that the two phi functions from each edge traversal: actual_height=phi(type 13), and actual_height_phi(type7) is changed to the finalized phi function with the correct number of operands: actual_height=phi(type13, type7), as shown in node 500 in FIG. 7. This would be desired for the full type information to be used in the verification of the SRC2 operand of the IL instruction shown below the phi functions.

Regarding the issue of a pre-order traversal only seeing one side at a time, if a use (i.e., an operand for an IL opcode) is placed somewhere after the join as illustrated above, then during the single pass over the block containing that use, only the one dominating definition will be present: actual_height=phi(type13). This is before actual_height=phi(type13, type7) is created.

Thus, a work list item is created for the IL instruction that uses the phi node and the work list is passed over after all the phi nodes have been finalized. Therefore, global verification of an IL instruction that has an operand which may involve JIT-temps defined along multiple paths would involve work list elements: IL-OP SRC1(type) SRC2(phi (type13, type7)). The actual data structure could be an IL opcode and two type fields for the operands. The type fields would involve a single type or a list of type (i.e., a phi node with types as operands).

This JIT architecture changes global verification into local verification on a list of operations in a work list where some of the operand types are the union of all the operands in finalized phi functions.

Exception handling (EH) can complicate verification, flow graph construction, and code generation. An embodiment of the present invention shields a developer from these details by performing the analysis and encapsulating the desired information in a customizable flow graph and a connected EH try-region graph. The flow graph and the EH try-region graph are now described by example, with respect to the following C# example.

```
1    public static void Main( ) {
2      try {
3
4        int z;
6
7        if(x == 5)
8          z = y / x;
9        else
10         z = x / y; // this throws a divide-by-0 exception (y is 0)
11     } catch (Exception) {
12
13       try {
14
15         Console.WriteLine("Welcome to the inner try.");
16         throw new Exception( );
```

-continued

```
17     } catch {
18
19       Console.WriteLine("We're in the inner catch.");
20       goto Done;
21     } finally {
22
23       Console.WriteLine("We're in the inner finally");
24     }
25
26     Console.WriteLine("Done with outer catch")
27   } finally {
28
29     Console.WriteLine("We're in the outer finally");
30   }
31
32   ConsoleWriteLine("Effectively dead code.");
33
34   Done:
35     Console.WriteLine("We're done.");
36 }
```

Initially, a try-region graph is built by encapsulating the lexical precedence of the various EH regions dictated by the semantics of the user's source code. The resulting try-region-graph 800 for the example is shown in FIG. 8.

A try-region graph is a tree and is an abstraction that looks analogous to a dominator tree imposed on a flow graph. A difference is that the arcs modeling EH constructs indicate lexical relationships in source code. Lexical precedence cannot be rediscovered from all flow graphs. Thus, a shareable reader is built around a flow graph that can be deleted and rebuilt, along with an invariant tree modeling exception handling.

Figure 8:
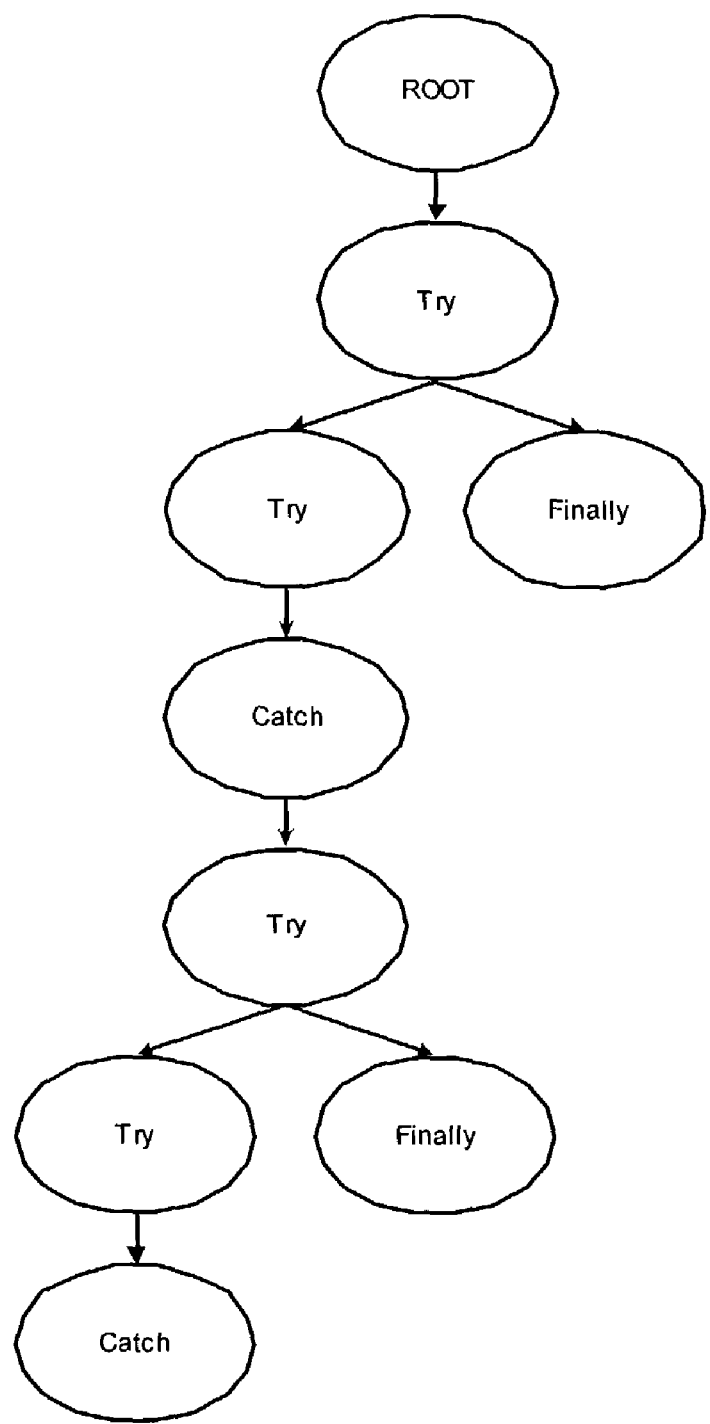
FIG. 8 is an exemplary exception handling try-region graph in accordance with the present invention.

It is noted that the specific try-region graph 800 in FIG. 8 looks a little more complicated than the example source C# program set forth above. This is because the concept of a try-catch-finally in C# is encoded in IL as a try-catch nested inside a try-finally.

There are bidirectional links between the flow graph and the try-region graph. The try-region graph maintains offsets into the IL that was originally parsed. Furthermore, the try-region graph is a compiler invariant that is preferably never destroyed and rediscovered. The flow graph preferably can be destroyed and rebuilt at any time. Rebuilding the flow graph will guarantee a parent link from every flow graph node back to the proper try region node. Moreover, the try-region graph can be modified due to discovery of unreachable code or code generation due to synchronous methods. Rebuilding the flow graph always re-establishes the correct link to the parent try region node.

Together, the try-region graph and the flow graph capture two different types of ordering constraints: possible runtime execution paths and lexical precedence imposed by EH syntax.

The IL byte stream and the try-region graph are used to construct the flow graph. During a pass of the IL byte codes, only those instructions that affect flow are noted. The try-region graph is superimposed on the skeleton flow graph, so that the final flow graph has the following properties: (1) a lexical EH boundary (denoted by the try-region graph) always breaks a basic block; (2) an edge (in the flow graph) is placed from the first block of a protected region to the first block of each of its associated handlers; and (3) each basic block (in the flow graph) has a parent pointer back to the unique node in the try-region graph to which the block is a member.

For the example, the flow graph 900 is shown in 9. The dashed edges 910 are asynchronous edges. During the flow graph construction, the flow sensitive verification of the code with regard to EH is performed. In particular, the rules pertaining to non-local flow (e.g., goto statements into and out of various protected regions and handlers) will be verified.

Figure 9:
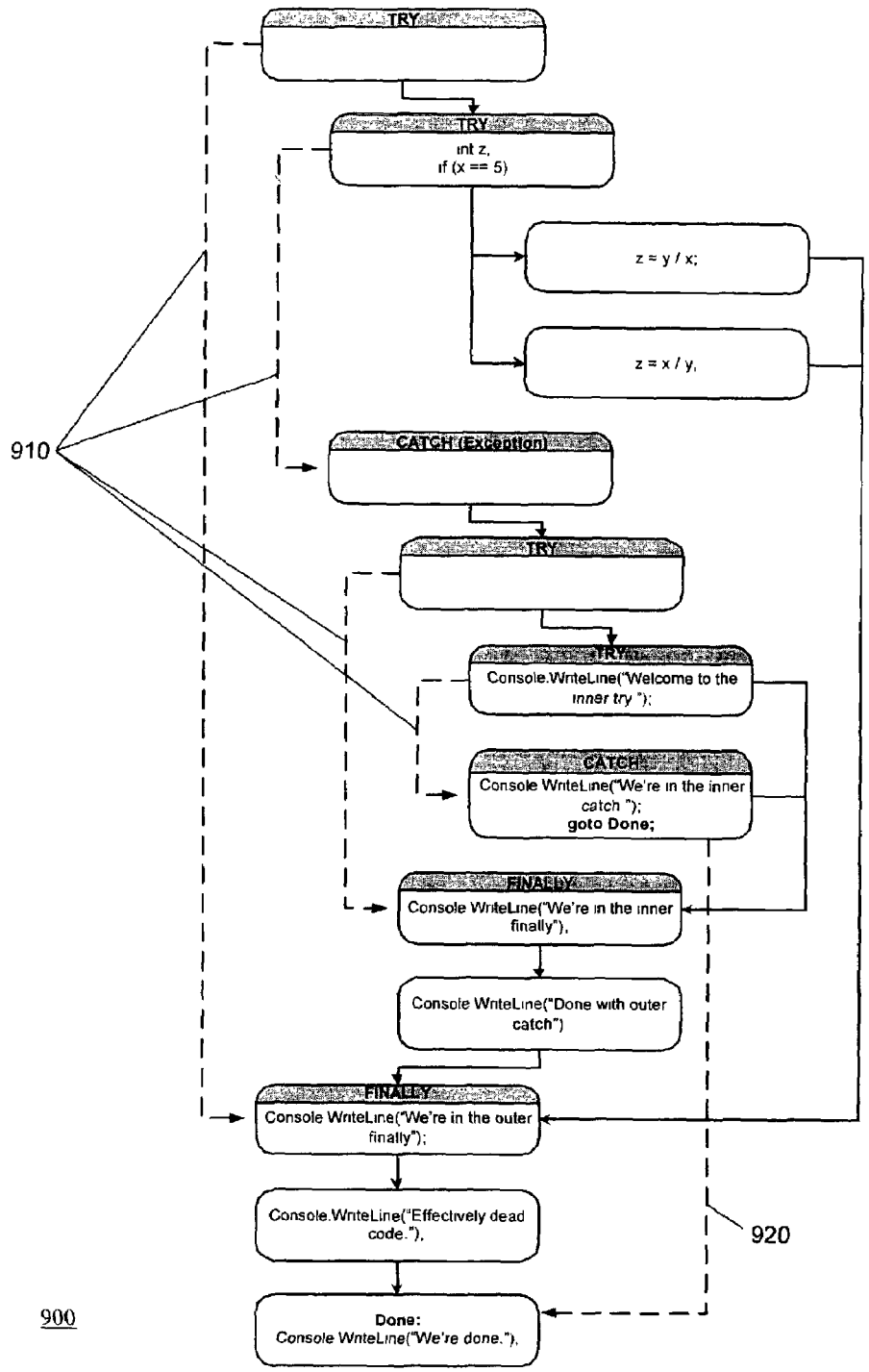
FIG. 9 is an exemplary flow graph in accordance with the present invention.

In the C# source example, there is a goto which leaves the inner most catch region and targets a label outside of any EH constructs (line 20 in the example, modeled as the dashed edge 920 in FIG. 9). It is possible that the client may have to generate additional code in such scenarios, depending on the underlying operating system architecture for EH. To communicate this to the client JIT, an EHNodeBase data structure is generated contains a NonLocalGotos list. NonLocalGotos is a list of pairs: each of the non-local gotos in the EH region are pointed to, and paired with, the list of each EH region which must be accounted for if the goto is taken.

According to an embodiment, catches and finallys are both implemented as funclets. Consequently, a goto which exits a region nested in catch regions preferably includes code which unwinds the stack frame associated with each of the catches going out of scope when the goto is taken. In the particular case of the source example, the EHNodeBase for the inner most catch region would have a pointer pointing to the "goto Done" instruction, and this pointer would be associated with a list which points to both catch regions in the try-region-graph, thereby telling the JIT that it should place code to unwind both of the catch's stack frames when implementing the goto.

The NonLocalGotos list is desirable for knowing when to call finallys. If there is a non-local goto which requires that finallys be executed before the jump is taken, then the goto itself will preferably be in the NonLocalGotos list and have an associated list of the finally regions which desirably will be called. This list can be used, along with the fact that finallys are implemented as funclets, to inject calls to the finallys prior to taking the jump.

At this point, a flow graph and a try-region graph have been created and point to each other. These two graphs are empty. A pass is made over the IL byte codes to allow a client to fill in its compiler specific IL nodes local to each basic block. Because a flow graph exists with pointers both to IL and the try-region graph, a pre-order traversal of the flow graph is performed, reading the byte codes between the beginning and ending IL offsets.

The reader loop does not instantiate any IL in a flow graph node that is unreachable. This is because the IL generation is demand driven by a pre-order traversal of a connected flow graph. Thus, the JIT does not have to build up and then tear down any IL that is dead.

The pre-order traversal that drives the loop can be exploited for (optional) optimization while reading. If the client augments the flow graph with dominator information or bit vectors that describe the iterated dominance frontier for each flow graph node, then a client could, while reading: create an SSA; remove local and global redundancy elimination; register variable detection (i.e., lifetimes assigned only to registers); perform constant propagation; and carry out expression optimization.

Thus, by taking advantage of the flow graph that is created before instantiating the IL, a compiler implementation can come out of this proposed reader in a customized IL form that is verified, partially optimized, and in an SSA form.

Verification is optional, and preferably, the client is not aware of verification being performed. "Simple" opcodes are defined as opcodes that can be verified by following a sequence of basic operations. Each simple opcode maps to a sequence, which is not necessarily unique. For example, ADD and SUB are equivalent from a verification standpoint. These basic operations are typically used in many opcode sequences. Verification of simple opcodes is modeled after the conventional PEVerify where the sequences of operations are represented as character strings. The following method is used: table mapping IL opcode ->character string. The strings are of the form <pop sequence>:<push sequence>. Push and pop sequence are characters that represent a sequence of actions that verify the instruction. An example is shown in Table 1.

TABLE 1

| CEE_LDC | -> ":4" | : push an I4 |
| CEE_LDELEM_I8 | -> "4[8:8" | : pop an I4 and an array of I8 ([8), then push an I8 |
| CEE_SUB | -> "N=:-" | : pop any numeric type(N), then another which must be of the same type as the first(=). Then undo the last pop(-) |
| CEE_CALL | -> "!" | : call a special routine (!), this opcode is complex and not verifiable through the simple set |

Note that 'pop an I4' is shorthand for 'verify that the top of the stack is an I4 and pop else fail'.

Most opcodes that map to strings containing a '!' are complex. There are CALL, CALLVIRT, NEWOBJ, field accessors, etc. This verification will take place in a conventional manner.

Thus, in summary, a data structure is provided, and a flow graph is created. The graph captures flow for any arbitrary EH construct. Each node contains start and end offsets corresponding to extents in the IL code bytes for the second pass over the IL byte codes. EH-related flow verification takes place within this method and a work list is built for handling verification failures. During the second pass, the IL bytes are passed over again, allowing a new compiler backend to insert its particular IL nodes per IL opcode. The node is inserted into the correct flow graph node which is passed as a parameter. Type verification per operand and global verification at points of confluence takes place within this method. Upon completion of parsing and verifying IL, using this reader, an implementation is given a flow graph, with properly demarcated EH regions and its own IL optionally in SSA form.

As mentioned above, while exemplary embodiments of the present invention have been described in connection with various computing devices and network architectures, the underlying concepts may be applied to any computing device or system in which an IL reader is desired. Thus, the techniques for IL reader implementation in accordance with the present invention may be applied to a variety of applications and devices. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/ or storage elements), at least one input device, and at least one output device.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed is:

1. In a computer system, a process of mapping arbitrary flow and definition points from an intermediate language (IL), the IL comprising byte codes, to an internal compiler representation, the process comprising:
    creating a flow graph having a plurality of nodes with pointers to the byte codes, the pointers indicating beginning and ending byte code offsets;
    identifying a plurality of definitions in the IL;
    mapping the definitions to the flow graph nodes;
    translating the IL into a compiler intermediate representation;
    performing global verification and optimization of the compiler intermediate representation in a single pass; and
    populating the flow graph nodes with the compiler intermediate representation,
    wherein the steps of creating the flow graph, identifying the definitions, and mapping the definitions are performed during a single pass over the IL,
    wherein the steps of translating the IL and populating the flow graph nodes are performed during a subsequent single pass over the IL,
    wherein the global verification comprises the avoidance of processing unreachable code, and is performed while translating the IL into the compiler intermediate representation used for further optimization and final machine code generation, and
    wherein the optimization is performed while translating the IL into a form for final machine code generation.

2. The process of claim 1, further comprising generating phi functions after mapping the definitions to the flow graph nodes.

3. The process of claim 1, further comprising generating a static single assignment (SSA).

4. The process of claim 1, further comprising implementing at least one zero initializer during the step of optimizing.

5. The process of claim 1, wherein identifying the definitions comprises analyzing unaliased scalars in the IL.

6. The process of claim 5, wherein identifying the definitions further comprises utilizing an extended SSA provided with the IL.

7. The process of claim 1, further comprising creating an exception handling (EH) try-region flow graph prior to creating the flow graph, and creating links between the EH try-region flow graph and the flow graph.

8. The process of claim 7, wherein creating the EH try-region flow graph comprises identifying lexical boundaries in the IL.

9. In a computer system, a process of modeling an intermediate language (IL), the IL having definitions, the process comprising:
    passing over the IL in a first single pass to create a flow graph having a plurality of nodes, to identify the definitions in the IL, and to map the definitions to the flow graph nodes; and
    passing over the IL in a second single pass to translate the IL into a compiler intermediate form for machine code generation, to populate the flow graph nodes, and to perform global verification and optimization of the compiler intermediate form,
    wherein the global verification comprises the avoidance of processing unreachable code, and is performed while translating the IL into the compiler intermediate representation use for further optimization and final machine code generation, and
    wherein the optimization is performed while translating the IL into a form for final machine code generation.

10. The process of claim 9, further comprising generating phi functions after mapping the definitions to any internal flow graph representation due to a graph creation paradigm appropriate for any target architecture or operating system.

11. The process of claim 9, further comprising generating a static single assignment (SSA) during a reader phase of a just-in-time (JIT) compiler.

12. The process of claim 9, wherein the global verification is performed while translating the IL into the compiler intermediate form a just-in-time (JIT) compiler uses for final machine code generation.

13. The process of claim 9, further comprising creating an exception handling (EH) try-region flow graph prior to creating the flow graph, and creating links between the EH try-region flow graph and the flow graph.

14. The process of claim 13, wherein creating the EH try-region flow graph comprises identifying lexical boundaries in the IL.

15. A computer-readable storage medium having stored thereon a byte code reader for use in a computer system, wherein the byte code reader maps an arbitrary flow and definition point in a byte code stream onto an internal flow graph having a plurality of nodes and a compiler intermediate form used for final machine code generation, the compiler intermediate form being globally verified and optimized in a single pass,
    wherein the byte code reader creates the flow graph, identifies definitions in the IL, and maps the definitions to the flow graph nodes during a single pass over the byte code, and translates the byte codes and populates the flow graph nodes during a subsequent single pass that fills flow graph nodes with a compiler intermediate representation that is used for final machine code generation,
    wherein the global verification comprises the avoidance of processing unreachable code, and is performed while translating the IL into the compiler intermediate representation, and
    wherein the optimizations is performed while translating the intermediate language into a form for final machine code generation.

16. The computer-readable storage medium of claim 15, wherein the reader generates phi functions after mapping the definitions to the associated containing flow graph nodes.

17. The computer-readable storage medium of claim 15, wherein the reader generates a static single assignment (SSA).

18. The computer-readable storage medium of claim 15, wherein the reader detects and eliminates dead code in the initial byte code stream by avoiding the traversal of unreachable flow graph nodes.

19. The computer-readable storage medium of claim 15, wherein the reader optimizes the byte code stream while translating the byte code stream into the compiler intermediate form a just-in-time (JIT) compiler uses to produce executable machine code.

20. The computer-readable storage medium of claim 19, wherein the reader implements at least one zero initializer during optimizing so that the resulting machine code is executable without any un-initialized local variables.

21. The computer-readable storage medium of claim 15, wherein the reader analyzes unaliased scalars in the IL and an extended SSA (ESSA) provided with the IL to identify the definitions.

22. The computer-readable storage medium of claim 15, wherein the reader further creates an exception handling (EH) try-region flow graph prior to creating the flow graph, and creates links between the EH try-region flow graph and the flow graph.

23. The computer-readable storage medium of claim 22, wherein the reader identifies lexical boundaries in the IL in creating the EH try-region flow graph.

24. A computer-readable storage medium having stored thereon a flow graph for use in a computer system, the flow graph for modeling an intermediate language, the intermediate language having definitions, the flow graph comprising a plurality of nodes that map to the definitions and populated pointers to byte code, the byte code comprising translated IL, the translated IL being globally verified and optimized in a single pass, wherein the flow graph is created, and the definitions are identified and mapped, during a single pass over the IL, wherein the IL is translated and the flow graph nodes are populated during a subsequent single pass over the IL, wherein the global verification comprises the avoidance of processing unreachable code, and is performed while translating the IL into the compiler intermediate representation used for further optimization and final machine code generation, and wherein the optimization is performed while translating the IL into a form for final machine code generation.

25. The computer-readable storage medium of claim 24, wherein a compiler intermediate representation of the byte code is free of unreachable code.

26. The computer-readable storage medium of claim 24, wherein the byte code comprises at least one zero initializer.

* * * * *